US007582716B2

(12) United States Patent
Liang et al.

(10) Patent No.: US 7,582,716 B2
(45) Date of Patent: *Sep. 1, 2009

(54) COMPOSITIONS OF ETHYLENE/α-OLEFIN MULTI-BLOCK INTERPOLYMER FOR BLOWN FILMS WITH HIGH HOT TACK

(75) Inventors: Wenbin Liang, Sugar Land, TX (US); Yunwa W. Cheung, Lake Jackson, TX (US); John W. Garnett, IV, Rosharon, TX (US)

(73) Assignee: Dow Global Technologies Inc., Midland, MI (US)

( * ) Notice: Subject to any disclaimer, the term of this patent is extended or adjusted under 35 U.S.C. 154(b) by 484 days.

This patent is subject to a terminal disclaimer.

(21) Appl. No.: 11/376,971

(22) Filed: Mar. 15, 2006

(65) Prior Publication Data
US 2006/0199030 A1 Sep. 7, 2006

Related U.S. Application Data

(63) Continuation-in-part of application No. PCT/US2005/008917, filed on Mar. 17, 2005.

(60) Provisional application No. 60/717,982, filed on Sep. 16, 2005, provisional application No. 60/553,906, filed on Mar. 17, 2004.

(51) Int. Cl.
*C08F 210/00* (2006.01)
*C08F 110/06* (2006.01)
*C08F 110/02* (2006.01)

(52) U.S. Cl. .................. 526/348; 526/351; 526/352

(58) Field of Classification Search .................. 526/348, 526/351, 352
See application file for complete search history.

(56) References Cited

U.S. PATENT DOCUMENTS

| 2,973,344 | A |   | 2/1961  | Fasce            |
|-----------|---|---|---------|------------------|
| 3,873,642 | A |   | 3/1975  | Jezl             |
| 4,146,492 | A |   | 3/1979  | Cusano et al.    |
| 4,299,931 | A |   | 11/1981 | Coran et al.     |
| 4,429,079 | A |   | 1/1984  | Shibata et al.   |
| 4,510,031 | A | * | 4/1985  | Matsumura et al. ........ 521/50.5 |
| 4,668,752 | A |   | 5/1987  | Tominari et al.  |
| 4,780,228 | A |   | 10/1988 | Gardiner et al.  |
| 4,798,081 | A |   | 1/1989  | Hazlitt et al.   |
| 5,068,047 | A |   | 11/1991 | Chung et al.     |
| 5,266,626 | A |   | 11/1993 | Hert et al.      |
| 5,322,728 | A |   | 6/1994  | Davey et al.     |
| 5,391,629 | A |   | 2/1995  | Turner et al.    |
| 5,468,810 | A |   | 11/1995 | Hayakawa et al.  |
| 5,594,080 | A |   | 1/1997  | Waymouth et al.  |
| 5,597,881 | A | * | 1/1997  | Winter et al. ............... 526/348 |
| 5,610,253 | A |   | 3/1997  | Hatke et al.     |
| 5,624,991 | A |   | 4/1997  | Harada et al.    |
| 5,733,980 | A |   | 3/1998  | Cozewith et al.  |
| 5,783,531 | A |   | 7/1998  | Andrew et al.    |
| 5,798,420 | A |   | 8/1998  | Cozewith et al.  |
| 5,916,953 | A |   | 6/1999  | Jacoby et al.    |
| 5,969,070 | A |   | 10/1999 | Waymouth et al.  |
| 6,008,262 | A |   | 12/1999 | McKay et al.     |
| 6,025,448 | A |   | 2/2000  | Swindoll et al.  |
| 6,096,668 | A |   | 8/2000  | Abuto et al.     |
| 6,114,457 | A |   | 9/2000  | Markel et al.    |
| 6,121,402 | A |   | 9/2000  | Machida et al.   |
| 6,136,937 | A |   | 10/2000 | Lai et al.       |
| 6,147,180 | A |   | 11/2000 | Markel et al.    |
| 6,160,029 | A |   | 12/2000 | Chaudhary et al. |
| 6,187,424 | B1 |  | 2/2001  | Kjellqvist et al.|
| 6,197,404 | B1 |  | 3/2001  | Varona           |
| 6,262,203 | B1 |  | 7/2001  | Chien et al.     |
| 6,362,252 | B1 |  | 3/2002  | Prutkin          |
| 6,380,341 | B1 |  | 4/2002  | Waymouth et al.  |
| 6,388,040 | B1 |  | 5/2002  | Fujita et al.    |
| 6,455,638 | B2 |  | 9/2002  | Laughner et al.  |
| 6,537,472 | B2 |  | 3/2003  | Masubuchi        |
| 6,566,446 | B1 |  | 5/2003  | Parikh et al.    |
| 6,566,544 | B1 |  | 5/2003  | Waymouth et al.  |
| 6,815,023 | B1 |  | 11/2004 | Tatarka et al.   |
| 7,005,395 | B2 |  | 2/2006  | Zafiroglu et al. |
| 2003/0027954 | A1 | | 2/2003 | Becke et al.     |
| 2003/0088037 | A1 | | 5/2003 | Stevens et al.   |
| 2003/0194575 | A1 | | 10/2003 | Tau et al.      |
| 2003/0195128 | A1 | | 10/2003 | Deckman et al.  |
| 2003/0216518 | A1 | | 11/2003 | Tau et al.      |

(Continued)

FOREIGN PATENT DOCUMENTS

EP 0 274 906 A2 7/1988

(Continued)

OTHER PUBLICATIONS

International Search Report and Written Opinion of the International Searching Authority, mailed Jun. 21, 2007 (PCT/US2006/009854).
International Preliminary Report on Patentability [Chap. I] (PCT/US2006/009854), dated Sep. 27, 2007.
International Preliminary Report on Patentability [Chap II] (PCT/US2006/009854), dated Nov. 19, 2007.

*Primary Examiner*—Nathan M Nutter

(57) ABSTRACT

The present invention relates to film layers and compositions having improved hot tack properties. The compositions comprise at least one ethylene/α-olefin interpolymer, wherein the ethylene/α-olefin interpolymer may have, for example, a Mw/Mn from about 1.7 to about 3.5, at least one melting point, Tm, in degrees Celsius, and a density, d, in grams/cubic centimeter, wherein the numerical values of Tm and d correspond to the relationship:

$Tm > -2002.9 + 4538.5(d) - 2422.2(d)^2$.

15 Claims, 7 Drawing Sheets

U.S. PATENT DOCUMENTS

| | | |
|---|---|---|
| 2004/0082750 A1 | 4/2004 | Tau et al. |
| 2004/0092662 A1 | 5/2004 | Goto et al. |
| 2004/0121922 A1 | 6/2004 | Okada et al. |
| 2004/0158011 A1 | 8/2004 | Jain et al. |
| 2004/0192147 A1 | 9/2004 | Smith et al. |
| 2005/0009993 A1* | 1/2005 | Morioka et al. ............. 525/323 |
| 2006/0030667 A1 | 2/2006 | Yalvac et al. |
| 2008/0299857 A1 | 12/2008 | Harding et al. |

FOREIGN PATENT DOCUMENTS

| | | |
|---|---|---|
| EP | 0 877 050 | 11/1998 |
| EP | 1 026 184 | 8/2000 |
| EP | 1097976 A2 | 5/2001 |
| EP | 0 958 313 B1 | 9/2002 |
| EP | 1 262 498 A2 | 12/2002 |
| EP | 1 588 843 | 10/2005 |
| JP | 2002-206007 A | 7/2002 |
| JP | 2004-204058 A | 7/2004 |
| WO | WO 95/27745 A1 | 10/1995 |
| WO | WO 95/27746 A1 | 10/1995 |
| WO | WO 98/34970 A1 | 8/1998 |
| WO | WO 99/35171 A1 | 7/1999 |
| WO | WO 00/37514 A1 | 6/2000 |
| WO | WO 02/066540 A2 | 8/2002 |
| WO | WO 02/079322 | 10/2002 |
| WO | WO 03/014046 A1 | 2/2003 |
| WO | WO 2005/090425 A1 | 9/2005 |
| WO | WO 2005/090426 | 9/2005 |
| WO | WO 2005/090426 A1 | 9/2005 |
| WO | WO 2005/090427 A1 | 9/2005 |

* cited by examiner

COMPOSITIONS OF ETHYLENE/α-OLEFIN MULTI-BLOCK INTERPOLYMER FOR BLOWN FILMS WITH HIGH HOT TACK

CROSS-REFERENCE TO RELATED APPLICATIONS

This application claims priority to PCT Application No. PCT/US2005/008917 (Dow 63558D), filed on Mar. 17, 2005, which in turn claims priority to U.S. Provisional Application No. 60/553,906, filed Mar. 17, 2004. The application further claims priority to U.S. Provisional Application Ser. No. 60/717,982 filed Sep. 16, 2005 (Dow 64437). For purposes of United States patent practice, the contents of the provisional applications and the PCT application are herein incorporated by reference in their entirety.

FIELD OF THE INVENTION

This invention relates to ethylene/α-olefin multi-block interpolymer compositions having hot tack properties and films made therefrom.

BACKGROUND AND SUMMARY OF THE INVENTION

It is often desirable to coat an article, substrate or film in order to modify the properties. A particularly desirable coating is that of a heat-sealable film, i.e., a film which is capable of being bonded to itself, another film or another substrate with the application of heat and/or pressure. In this manner, the article, substrate or film can be sealed to form structures such as bags or other packaging materials.

Laminates and single or multi-layer films are two packaging materials that often employ heat-sealable layers. Laminates are conveniently made by coating a substrate, for example, paper or film, with a heat-sealable layer by extrusion coating. Extrusion coating is a process whereby a polymer or blend of polymers is fed into an extruder hopper. In the hopper the polymer or blend is melted and passed through a die to form a web. The web is then extruded onto the substrate through a nip roll/chill roll interface, for example, so that the molten web is pressed onto the substrate. The substrate is cooled by the chill roll and the wound up at a winder.

Similarly, many different processes are often employed to make single or multi-layer films which are useful as packaging materials. Such processes can include bubble extrusion and biaxial orientation processes, as well as, tenter frame techniques. In order to facilitate sealing, the heat-sealable film is usually employed singly or as the outermost or innermost layer in the case of multi-layer films.

Laminates and single or multi-layer films having a heat-sealable film layer are often used in "form, fill, and seal" machines. These machines create from film a continuous stream of packages that are capable of being closed by film-to-film seals. Often such packages are sealed via heat seal jaws that apply heat and pressure to form the film-to-film seal closure.

The heat seal closures made via the heat seal jaws will often be strongest after the seal has cooled to ambient temperature. However, in order to increase the production capacity, the packages are often filled with product before the bottom seal has had time to completely cool, therefore, the polymers at the seal interface haven't completely solidified (or recrystallized) or they are still in a softened state. Thus, the closure must exhibit a sufficient strength very rapidly without the need for cooling to ambient temperature. Otherwise, the closure will be destroyed by the weight of the product when the package is filled.

"Seal strength" is the strength of a heat seal at ambient temperature after the seal has been formed and reached its full strength. However, as described above the properties of the seal at temperatures subsequent to formation but prior to cooling to ambient conditions are often important. The properties of seal strength at temperatures above ambient are often referred to as "hot tack" properties.

There are a number of different hot tack properties that are important for heat-sealable films. One important hot tack property is the "initiation temperature." The initiation temperature is the first temperature above ambient at which a seal can be formed by applying a given pressure to a given thickness of film for a given length of time. Often the initiation temperature is expressed as the minimum temperature at which a 2 mil film forms a seal with a strength of 0.5N/in. using ASTM F 1921, Method B. In general, lower initiation temperatures are desirable because less energy is required to be used to form the seal and also the less time it takes for the initial seal to form at a given seal jaw temperature. Thus, production rates are capable of being increased.

Another important hot tack property is "ultimate hot tack." Ultimate hot tack is the largest strength the seal has at temperatures above the initiation temperature. Usually it is desirable that the ultimate hot tack occurs at the lowest possible temperature. Another hot tack property that is generally desirable is a wide processing window such that the film exhibits a suitable seal strength as measured over a broad temperature range. Also generally desirable is high temperature hot tack such that the seal strength remains sufficient even at elevated temperatures.

The hot tack properties are often determined by the composition employed to form the film seal. In the past, compositions such as those described in U.S. Pat. No. 4,339,507 and U.S. Pat. No. 5,741,861 that are a mixture of, for example, low density polyethylene and linear low density ethylene hydrocarbon copolymer have been employed. Unfortunately, however, such compositions often have hot tack properties that may limit the production capacity. The compositions of U.S. Pat. No. 6,262,174 comprising, for example, mixtures of polypropylene and polyethylenes, solved many of the aforementioned problems. However, it is still desirable to discover new compositions that have improved hot tack properties and broad melting temperature windows. In addition, for applications in which ease of opening is desired (e.g. cereal boxes) compositions with controlled heat seal strength are desirable.

Advantageously, new compositions have been discovered which give superior hot tack properties, broad processing windows, and controlled heat seal strength. The compositions comprise one or more ethylene/α-olefin interpolymers. The compositions can further comprise one or more other polymers, as well as, one or more additives. Suitable film structures include both monolayer and multilayer films.

DETAILED DESCRIPTION OF THE INVENTION

General Definitions

Figure 1:
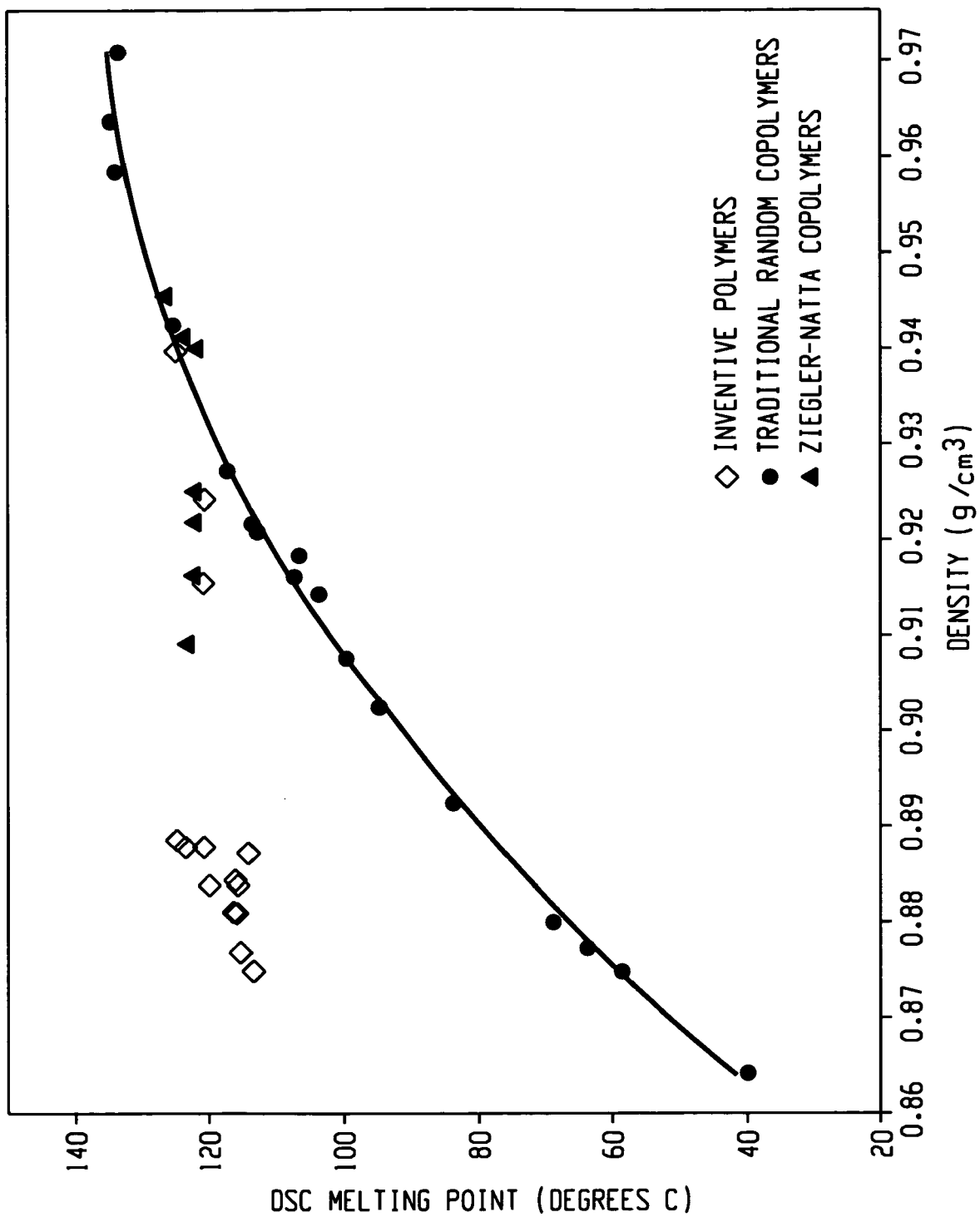
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and "copolymer" are used interchangeably herein. In some embodiments, the multi-block copolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835 entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9+4538.5(d)-2422.2(d)^2, \text{ and preferably}$$

$$T_m \geq -6288.1+13141(d)-6720.3(d)^2, \text{ and more preferably}$$

$$T_m \geq 858.91-1825.3(d)+1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
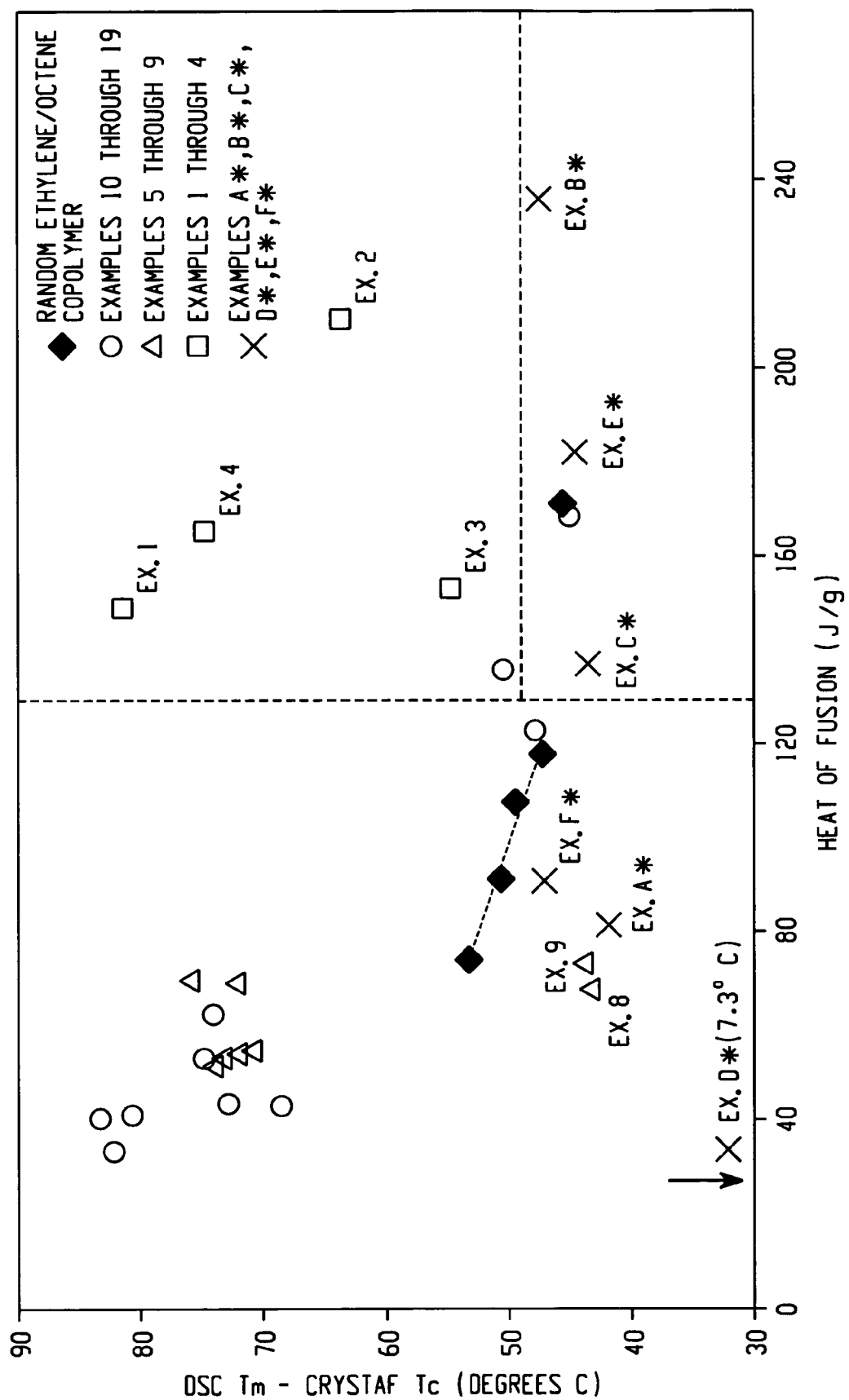
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H)+62.81, \text{ and preferably}$$

$$\Delta T \geq -0.1299(\Delta H)+64.38, \text{ and more preferably}$$

$$\Delta T \geq -0.1299(\Delta H)+65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; and preferably $Re \geq 1491 - 1629(d)$; and more preferably $Re \geq 1501 - 1629(d)$; and even more preferably $Re \geq 1511 - 1629(d)$.

Figure 3:
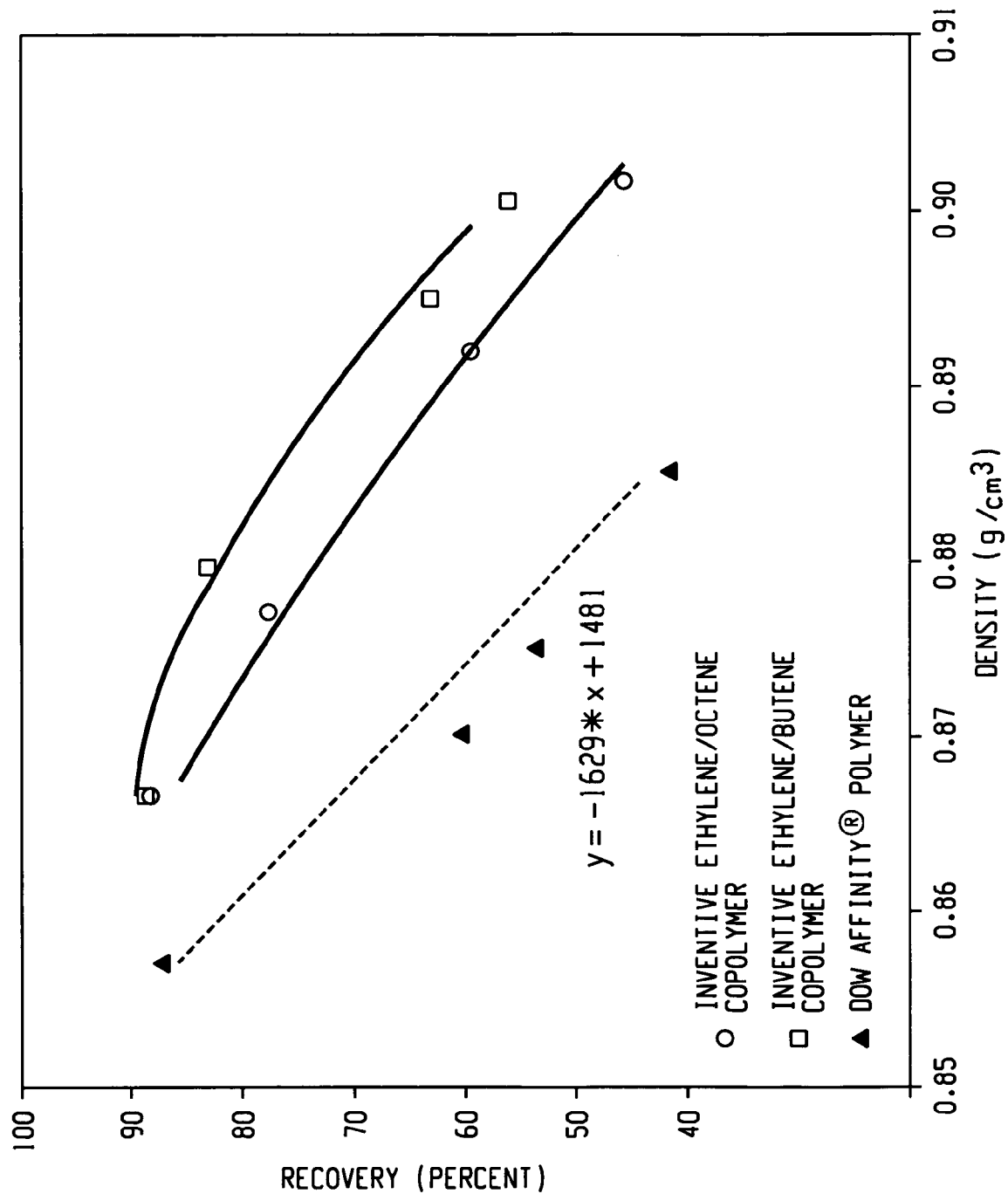
FIG. 3 shows the effect of density on elastic recovery for unoriented films made from inventive interpolymers(represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength≧11 MPa, more preferably a tensile strength≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
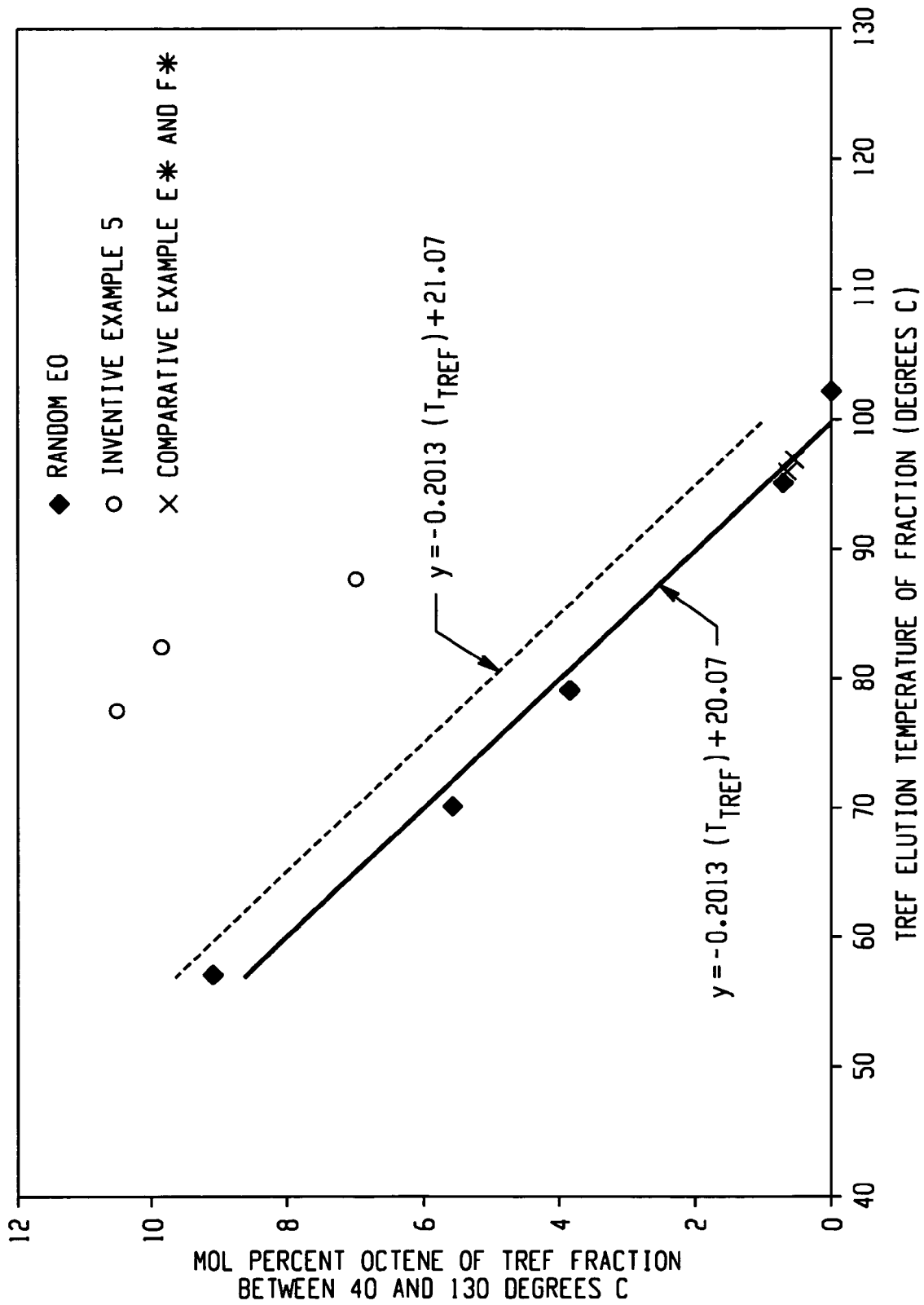
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
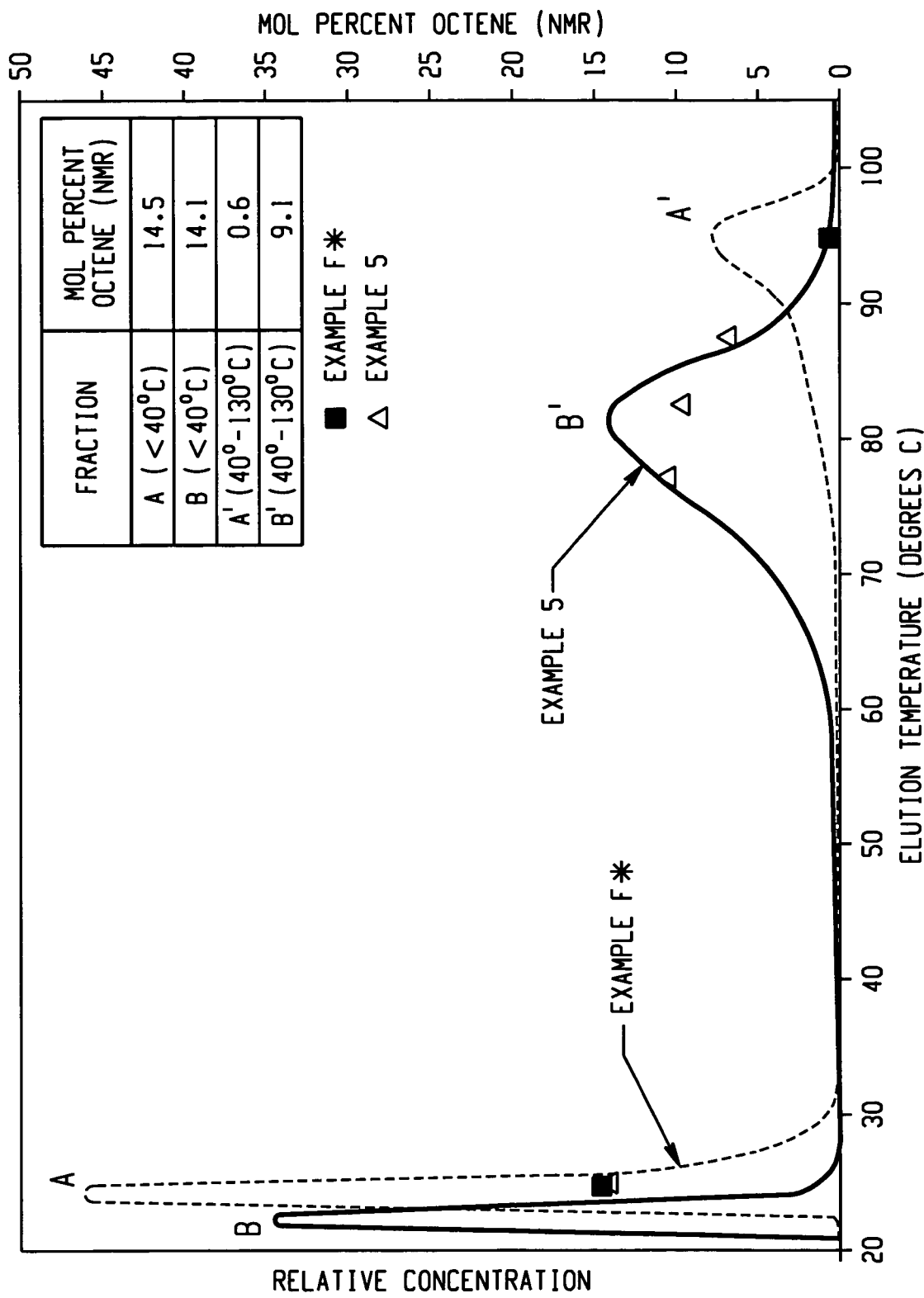
FIG. 5 is a plot of octene content of TREF fractionated ethylene/1-octene copolymer fractions versus TREF elution temperature of the fraction for the polymer of Example 5 (curve 1) and for comparative F (curve 2). The squares represent Example F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013) T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(\text{ATREF elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia, Spain (http:H/www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372°K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln\, P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln\, P = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln\, P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than $-25°$ C., more preferably less than $-30°$ C., and/or (5) one and only one $T_m$.

Figure 6:
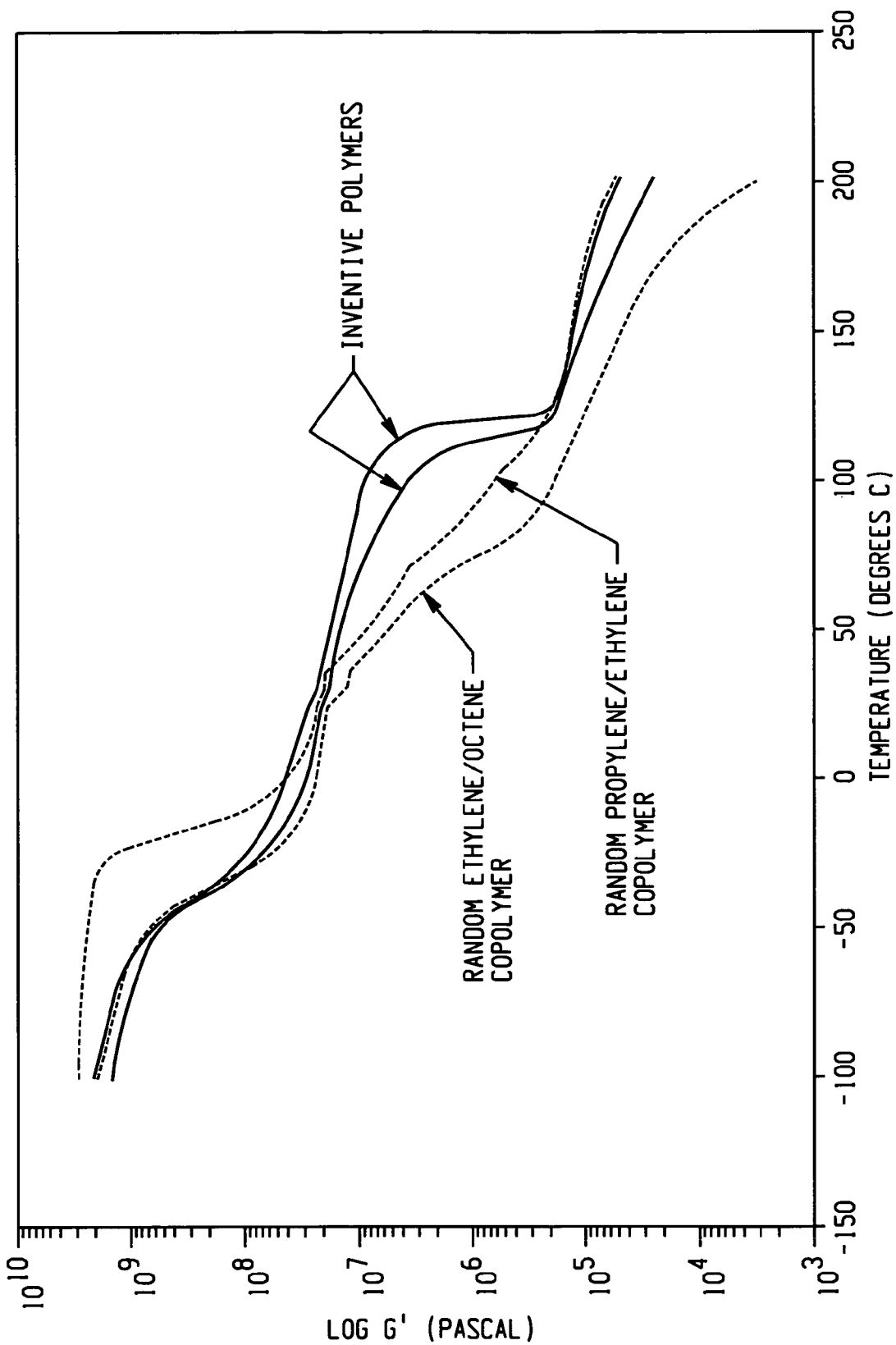
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of $100°$ C. Moreover, the inventive polymers possess a relatively flat storage modulus as a function of temperature in the range from 0 to $100°$ C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and $100°$ C., preferably between 0 and $100°$ C.).

Figure 7:
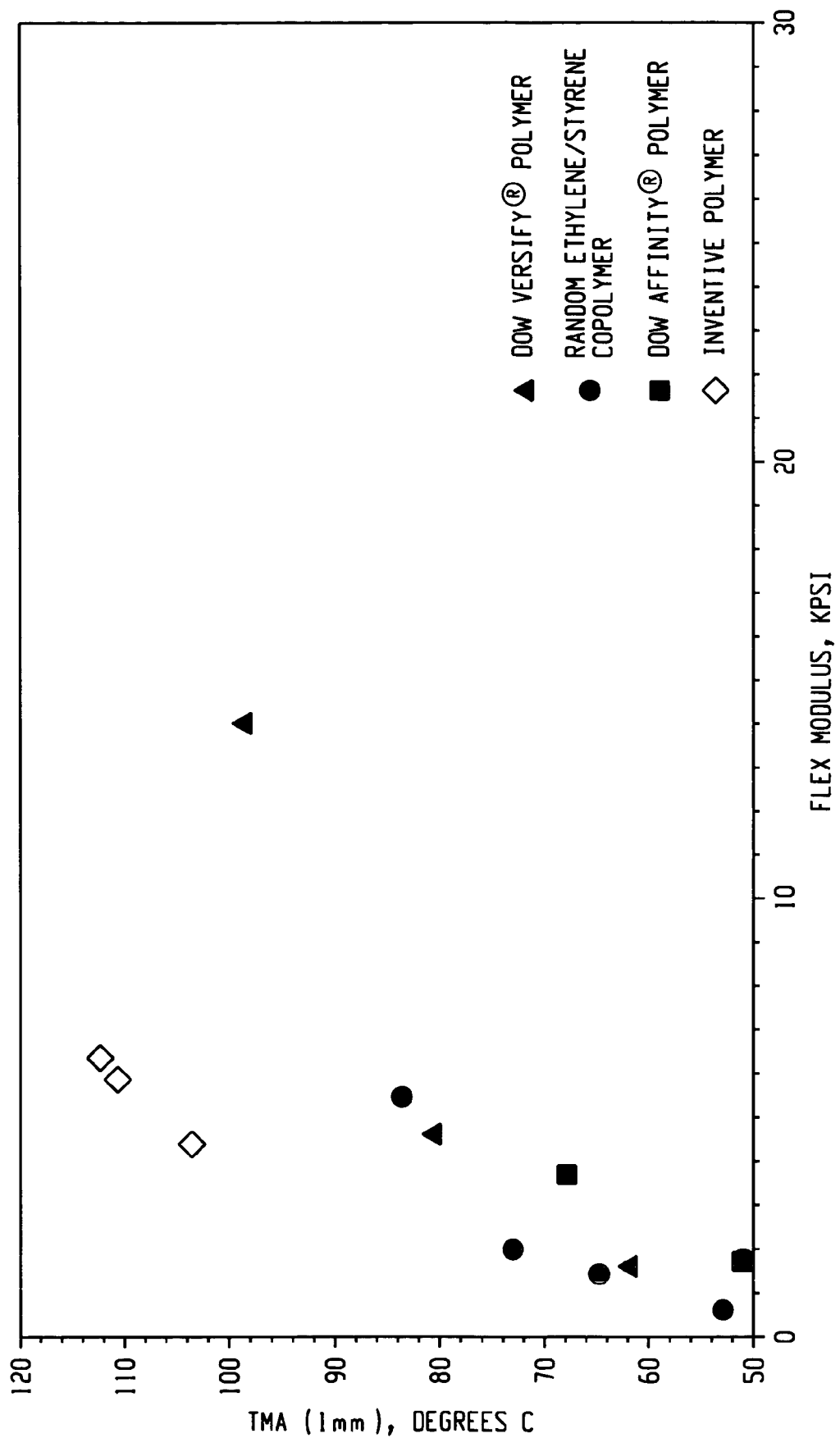
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least $90°$ C. as well as a flexural modulus of from 3 kpsi (20 MPa) to 13 kpsi (90 MPa). Alternatively, the inventive interpolymers can have a thermomechanical analysis penetration depth of 1 mm at a temperature of at least $104°$ C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/5,662,938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

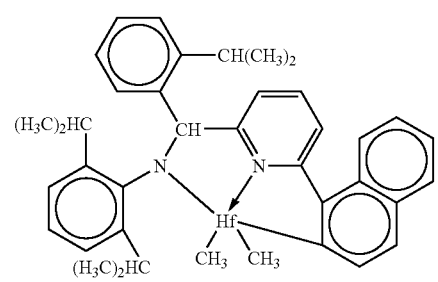

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429, 024, filed May 2, 2003, and WO 04/24740.

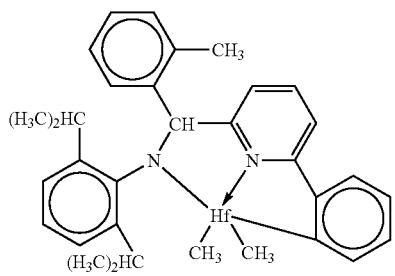

Catalyst (A3) is bis[N,N'''-(2,4,6-tri(methylphenyl)amido) ethylenediamine]hafnium dibenzyl.

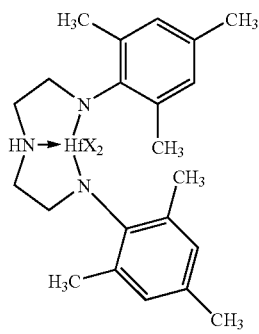

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

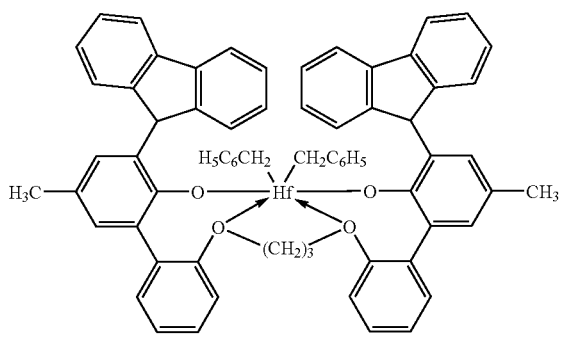

Catalyst (B1) is 1,2-bis-(3,5-di-t-butylphenylene)(1-(N-(1-methylethyl)immino)methyl)(2-oxoyl)zirconium dibenzyl

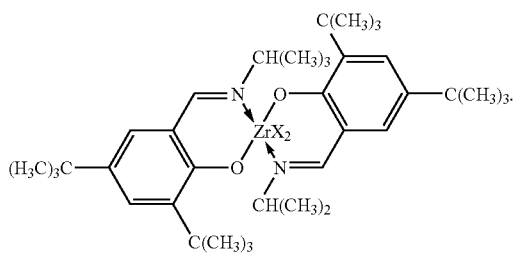

X = CH₂C₆H₅

Catalyst (B2) is 1,2-bis-(3,5-di-t-butylphenylene)(1-(N-(2-methylcyclohexyl)-immino)methyl)(2-oxoyl)zirconium dibenzyl

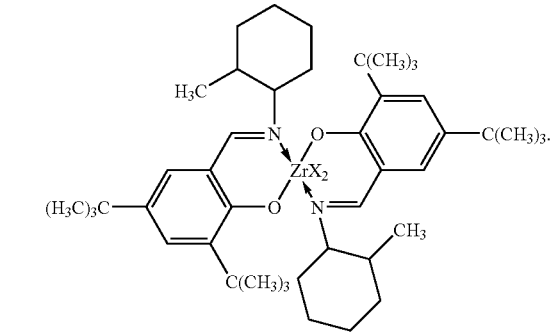

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

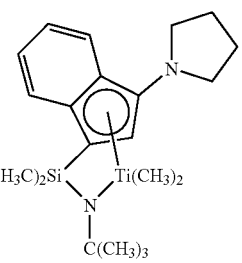

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

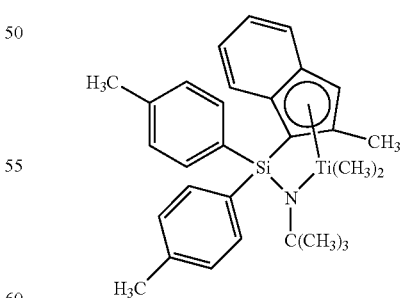

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

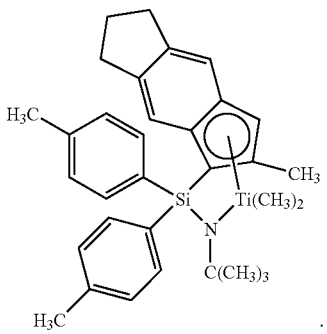

Catalyst (D1) is bis(dimethyldisiloxane)(indene-1-yl)zirconium dichloride available from Sigma-Aldrich:

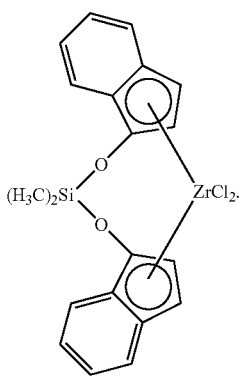

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene} = 0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the $1^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl)zirconium dibenzyl A solution of (1-methylethyl)(2-hydroxy-3,5-di(t-butyl) phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1H$ NMR is consistent with the desired product as a mixture of isomers.

b) Preparation of bis-(1-(2-methylcyclohexyl)ethyl) (2-oxoyl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and $Li[B(C_6F_5)_4]$, substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl) zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis (t-butyldimethylsiloxide) (SA14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide (SA18), ethylzinc (2,6-diphenylphenoxide) (SA19), and ethylzinc (t-butoxide) (SA20).

EXAMPLES 1-4, COMPARATIVE A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 µL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (µmol) | Cat (B1) (µmol) | Cocat (µmol) | MMAO (µmol) | shuttling agent (µmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | $5.30^2$ | 5.5 |
| 1 | 0.06 | 0.1 | 0.192 | — | DEZ (8.0) | 0.1974 | 28715 | 1.19 | 4.8 |

TABLE 1-continued

| Ex. | Cat. (A1) (µmol) | Cat (B1) (µmol) | Cocat (µmol) | MMAO (µmol) | shuttling agent (µmol) | Yield (g) | Mn | Mw/Mn | hexyls[1] |
|---|---|---|---|---|---|---|---|---|---|
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1] $C_6$ or higher chain content per 1000 carbons
[2] Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

EXAMPLES 5-19, COMPARATIVES D-F

Continuous Solution Polymerization, Catalyst A1/B2+DEZ

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/[DEZ]^4$ | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |

TABLE 2-continued

Process details for preparation of exemplary polymers

| Ex. | C$_8$H$_{16}$ kg/hr | Solv. kg/hr | H$_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C$_2$H$_4$]/ [DEZ][4] | Poly Rate[5] kg/hr | Conv %[6] | Solids % | Eff.[7] |
|---|---|---|---|---|---|---|---|---|---|---|---|---|---|---|---|---|---|
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino)zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of exemplary polymers

| Ex. | Density (g/cm$^3$) | I$_2$ | I$_{10}$ | I$_{10}$/I$_2$ | Mw (g/mol) | Mn (g/mol) | Mw/Mn | Heat of Fusion (J/g) | T$_m$ (°C.) | T$_c$ (°C.) | T$_{CRYSTAF}$ (°C.) | Tm – T$_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY® EG8100, available from The Dow Chemical Company), Comparative I is a substantially linear ethylene/1-octene copolymer (AFFINITY® PL1840, available from The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G'(25° C.)/G'(100° C.) | 300% Strain Recovery (80° C.) (percent) | Compression Set (70° C.) (percent) |
| --- | --- | --- | --- | --- | --- |
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |

TABLE 6-continued

Polymer Optical Properties

| Ex. | Internal Haze (percent) | Clarity (percent) | 45° Gloss (percent) |
|---|---|---|---|
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the either begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}C$ NMR

Additional Polymer Examples 19 A-J

Continuous Solution Polymerization, Catalyst A1/B2+DEZ

For Examples 19A-I

Continuous solution polymerizations are carried out in a computer controlled well-mixed reactor. Purified mixed alkanes solvent (Isopar™ E available from Exxon Mobil, Inc.), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

For Example 19J

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Process details and results are contained in Table 8. Selected polymer properties are provided in Tables 9A-C.

In Table 9B, inventive examples 19F and 19G show low immediate set of around 65-70% strain after 500% elongation.

TABLE 8

Polymerization Conditions

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % |
|---|---|---|---|---|---|---|---|---|---|---|
| 19A | 55.29 | 32.03 | 323.03 | 101 | 120 | 600 | 0.25 | 200 | 0.42 | 3.0 |
| 19B | 53.95 | 28.96 | 325.3 | 577 | 120 | 600 | 0.25 | 200 | 0.55 | 3.0 |
| 19C | 55.53 | 30.97 | 324.37 | 550 | 120 | 600 | 0.216 | 200 | 0.609 | 3.0 |
| 19D | 54.83 | 30.58 | 326.33 | 60 | 120 | 600 | 0.22 | 200 | 0.63 | 3.0 |
| 19E | 54.95 | 31.73 | 326.75 | 251 | 120 | 600 | 0.21 | 200 | 0.61 | 3.0 |
| 19F | 50.43 | 34.80 | 330.33 | 124 | 120 | 600 | 0.20 | 200 | 0.60 | 3.0 |
| 19G | 50.25 | 33.08 | 325.61 | 188 | 120 | 600 | 0.19 | 200 | 0.59 | 3.0 |
| 19H | 50.15 | 34.87 | 318.17 | 58 | 120 | 600 | 0.21 | 200 | 0.66 | 3.0 |
| 19I | 55.02 | 34.02 | 323.59 | 53 | 120 | 600 | 0.44 | 200 | 0.74 | 3.0 |
| 19J | 7.46 | 9.04 | 50.6 | 47 | 120 | 150 | 0.22 | 76.7 | 0.36 | 0.5 |

| Ex. | DEZ Flow lb/hr | Cocat 1 Conc, ppm | Cocat 1 Flow lb/hr | Cocat 2 Conc. ppm | Cocat 2 Flow lb/hr | $Zn^4$ in polymer ppm | Poly Rate[5] lb/hr | Conv[6] wt % | Polymer wt % | Eff.[7] |
|---|---|---|---|---|---|---|---|---|---|---|
| 19A | 0.70 | 4500 | 0.65 | 525 | 0.33 | 248 | 83.94 | 88.0 | 17.28 | 297 |
| 19B | 0.24 | 4500 | 0.63 | 525 | 0.11 | 90 | 80.72 | 88.1 | 17.2 | 295 |
| 19C | 0.69 | 4500 | 0.61 | 525 | 0.33 | 246 | 84.13 | 88.9 | 17.16 | 293 |
| 19D | 1.39 | 4500 | 0.66 | 525 | 0.66 | 491 | 82.56 | 88.1 | 17.07 | 280 |
| 19E | 1.04 | 4500 | 0.64 | 525 | 0.49 | 368 | 84.11 | 88.4 | 17.43 | 288 |
| 19F | 0.74 | 4500 | 0.52 | 525 | 0.35 | 257 | 85.31 | 87.5 | 17.09 | 319 |
| 19G | 0.54 | 4500 | 0.51 | 525 | 0.16 | 194 | 83.72 | 87.5 | 17.34 | 333 |
| 19H | 0.70 | 4500 | 0.52 | 525 | 0.70 | 259 | 83.21 | 88.0 | 17.46 | 312 |
| 19I | 1.72 | 4500 | 0.70 | 525 | 1.65 | 600 | 86.63 | 88.0 | 17.6 | 275 |
| 19J | 0.19 | — | — | — | — | — | — | — | — | — |

[1]standard $cm^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino)zirconium dimethyl
[4]ppm in final product calculated by mass balance
[5]polymer production rate
[6]weight percent ethylene conversion in reactor
[7]efficiency, kg polymer/g M where g M = g Hf + g Z

TABLE 9A

Polymer Physical Properties

| Ex. | Density (g/cc) | I2 | I10 | I10/I2 | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19A | 0.8781 | 0.9 | 6.4 | 6.9 | 123700 | 61000 | 2.0 | 56 | 119 | 97 | 46 | 73 | 40 |
| 19B | 0.8749 | 0.9 | 7.3 | 7.8 | 133000 | 44300 | 3.0 | 52 | 122 | 100 | 30 | 92 | 76 |
| 19C | 0.8753 | 5.6 | 38.5 | 6.9 | 81700 | 37300 | 2.2 | 46 | 122 | 100 | 30 | 92 | 8 |
| 19D | 0.8770 | 4.7 | 31.5 | 6.7 | 80700 | 39700 | 2.0 | 52 | 119 | 97 | 48 | 72 | 5 |
| 19E | 0.8750 | 4.9 | 33.5 | 6.8 | 81800 | 41700 | 2.0 | 49 | 121 | 97 | 36 | 84 | 12 |
| 19F | 0.8652 | 1.1 | 7.5 | 6.8 | 124900 | 60700 | 2.1 | 27 | 119 | 88 | 30 | 89 | 89 |
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |
| 19I | 0.8774 | 11.2 | 75.2 | 6.7 | 66400 | 33700 | 2.0 | 49 | 119 | 99 | 40 | 79 | 13 |
| 19J | 0.8995 | 5.6 | 39.4 | 7.0 | 75500 | 29900 | 2.5 | 101 | 122 | 106 | — | — | — |

TABLE 9B

Polymer Physical Properties of Compression Molded Film

| Example | Density (g/cm³) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19A | 0.878 | 0.9 | 15 | 63 | 131 | 85 | 79 | 74 |
| 19B | 0.877 | 0.88 | 14 | 49 | 97 | 86 | 84 | 81 |
| 19F | 0.865 | 1 | — | — | 70 | — | 87 | 86 |
| 19G | 0.865 | 0.9 | — | — | 66 | — | — | 87 |
| 19H | 0.865 | 0.92 | — | 39 | — | — | 87 | — |

TABLE 9C

Average Block Index For exemplary polymers[1]

| Example | Zn/C₂[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the calculation of the block indices for various polymers is disclosed in U.S. patent application Ser. No. _____ (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

[2] Zn/C₂ *1000 = (Zn feed flow*Zn concentration/1000000/Mw of Zn)/(Total Ethylene feed flow*(1-fractional ethylene conversion rate)/Mw of Ethylene) *1000. Please note that "Zn" in "Zn/C₂*1000" refers to the amount of zinc in diethyl zinc ("DEZ") used in the polymerization process, and "C2" refers to the amount of ethylene used in the polymerization process.

Particularly Useful Ethylene/α-Olefin Multi-Block Interpolymer Component(s) for Compositions having Improved Hot Tack It has been discovered that some ethylene/α-olefin multi-block interpolymers are particularly beneficial in compositions suitable for film. For example, especially useful ethylene/α-olefin multi-block interpolymers are those with a density (as measured in accordance with ASTM D-792) generally greater than about 0.860 g/cc, preferably from about 0.89 g/cc to about 0.94 g/cc, more preferably from about 0.887 g/cc to about 0.928 g/cc, and even more preferably from about 0.900 g/cc to about 0.925 g/cc. Interpolymers of these density can be used alone or mixed with other polymers to make compositions having improved hot tack properties.

Similarly, the molecular weight of the aforementioned ethylene/α-olefin multi-block interpolymers should usually be considered when selecting said interpolymer for a given film application. The molecular weight of the interpolymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. The melt index for the above interpolymers that may be especially useful for film compositions is generally from about 0.1 g/10 min. to about 10 g/10 min., preferably from about 0.2 g/10 min. to about 5 g/10 min., and especially from about 0.5 g/10 min. to about 3 g/10 min. Interpolymers of these melt index can be used alone or mixed with other polymers to make compositions suitable for film with beneficial properties.

Compositions Comprising the Ethylene/α-Olefin Multi-Block Interpolymer Component(s) having High Hot Tack The specific composition chosen for a given film will often depend upon the type of film, number of layers, its desired application and desired properties. In addition to hot tack such properties may include, for example, processing, strength, or adhesion characteristics. By using an appropriate composition comprising one or more of the ethylene/α-olefin multi-block interpolymers described above enhanced performance or improved combinations of desired properties of a film may be obtained.

In a preferred embodiment a composition comprising a single ethylene/α-olefin multi-block interpolymer described above may be used. Alternatively, a composition comprising two or more of the above-described ethylene/α-olefin multi-block interpolymers (each having one or more different properties) may be used. Yet another alternative involves using a composition comprising one or more of the ethylene/α-olefin multi-block interpolymers described above blended with one or more other polymers such as substantially linear ethylene interpolymers or homopolymers (SLEP), high pressure low density polyethylene (LDPE), ethylene/vinyl acetate copolymer (EVA), ethylene/carboxylic acid copolymers and ionomers thereof, polybutylene (PB), and α-olefin polymers such as high density polyethylene, medium density polyethylene, polypropylene, ethylene/propylene interpolymers, linear low density polyethylene (LLDPE) and ultra low density polyethylene, as well as graft-modified polymers, and combinations thereof including density, MWD, and/or comonomer combinations such as those disclosed, for example, by Smith in U.S. Pat. No. 5,032,463 which is incorporated herein by reference. For multi-layer films it may be preferable in some circumstances that the outer film layers (alternatively referred to in the art as "skin layers" or "surface layers") and/or the sealant layers comprise ethylene/α-olefin multi-block interpolymer, substantially linear ethylene interpolymer and/or homopolymer, or a mixture thereof.

While it often depends on the desired properties, preferable compositions for films often comprise at least about 20, more preferably at least about 30, yet more preferably at least about 50 weight percent ethylene/α-olefin multi-block interpolymer based on the total weight of the composition. Often it is desirable to include additional polymers or polymer blends made with a Ziegler catalyst, a constrained geometry catalyst, or a combination thereof. Particularly useful additional polymers include for example, SLEP, LLDPE, LDPE, polypropylene and blends thereof such as described in, for example, U.S. Pat. Nos. 5,844,045; 5,847,053; 6,111,023 and 6,262,174. Such polymers are sold commercially by, for example, The Dow Chemical Company and Exxon, under the names AFFINITY®, Elite™, Dowlex™, and Exact™. The compositions of the present invention also are compatible and especially suited for blends with HDPE which is often used as a film barrier layer. In addition, blends comprising polypropylene and LDPE may achieve even better hot tack properties in some situations as described in U.S. Pat. No. 6,262,174. For situations in which easy opening bags are desired, it may be desirable to employ a heat sealable film layer comprising ethylene/α-olefin multi-block interpolymer and polybutylene or another butylene polymer that is compatible with the ethylene/α-olefin multi-block interpolymer.

The compositions above can be formed by any convenient method including those described in U.S. Pat. No. 6,262,174 the disclosure of which is incorporated herein in its entirety by reference. For example, the blends may be prepared by mixing or kneading the respective components at a temperature around or above the melt point temperature of one or more of the components. For most ethylene/α-olefin multi-block interpolymer compositions, this temperature may be above 130° C., most generally above 145° C., and most preferably above 1500° C. Typical polymer mixing or kneading equipment that is capable of reaching the desired temperatures and melt plastifying the mixture may be employed. These include mills, kneaders, extruders (both single screw and twin-screw), Banbury mixers, calenders, and the like. The sequence of mixing and method may depend on the final composition. A combination of Banbury batch mixers and continuous mixers may also be employed, such as a Banbury mixer followed by a mill mixer followed by an extruder.

Another method of forming the above compositions comprises in-situ polymerization as disclosed in U.S. Pat. No. 5,844,045 in the names of Brian W. S. Kolthammer and Robert S. Cardwell, the disclosure of which is incorporated herein in its entirety by reference. U.S. Pat. No. 5,844,045 describes inter alia, interpolymerizations of ethylene and $C_3$-$C_{20}$ alpha-olefins using at least one homogeneous catalyst in at least one reactor and at least one heterogeneous catalyst in at least one other reactor. The multiple reactors can be operated in series or in parallel or any combination thereof, with at least one reactor employed to make an ethylene/α-olefin multi-block interpolymer as described above. In this manner, blends may be made in solution processes comprising constrained geometry catalysts, Ziegler catalysts, and combinations thereof. Such blends comprise, for example, one or more ethylene/α-olefin multi-block interpolymers (as described above and in PCT/US2005/008917 filed Mar. 17, 2004), one or more polymers of broad molecular weight distribution (e.g. heterogeneously branched ethylene polymers as described in, for example, U.S. Pat. No. 5,847,053), and/or one or more polymers of narrow molecular weight distribution (e.g., homogeneous polymers as described in U.S. Pat. No. 3,645,992 (Elston) or U.S. Pat. No. 5,272,236).

In-situ polymerization using solution polymerization reactors in series may be particularly preferable when making blends that comprise at least one high molecular weight polymer of narrow molecular weight distribution and at least one polymer of broad molecular weight distribution made with a Ziegler catalyst. This is because it often requires substantial solvent to make high molecular weight polymer while the use of Ziegler catalysts often requires higher temperatures than homogeneous catalysts. Thus, the use of higher temperatures with the Ziegler catalyst in a subsequent reactor will facilitate excess solvent evaporation. In addition, another advantage to using series solution reactors to make the products of the invention is that an extremely high molecular weight product (e.g., $I_2$ of 0.05 g/10 minutes or less) can be made and incorporated into the finished product, even though that extremely high molecular weight product often could not physically be isolated without catastrophic reactor fouling. So for those "blends" incorporating a very high molecular weight component, a discrete or physical blend is often not even possible, since the first component could not be isolated.

Other general guidelines can be used by those in skill in the art to select a composition for a film with desired properties. For example, it has been found that ethylene/α-olefin multi-block interpolymers made with larger amounts of chain shuttling agents tend to exhibit lower initiation temperatures and broader hot tack windows.

Depending on the amount and type of chain shuttling agent employed to make the ethylene/α-olefin multi-block interpolymer, the compositions of the present invention may further comprise the residue of the chain shuttling agent or agents that were employed. By residue is meant an analytically detectable amount of either the original chain shuttling agent or a derivative thereof, e.g., zinc or aluminum compounds.

Useful Additives

Additives such as antioxidants (e.g., hindered phenolics (such as Irganox.RTM. 1010 or Irganox.RTM. 1076), phosphites (e.g., Irgafos.RTM. 168 all trademarks of Ciba Geigy), processing aids, cling additives (e.g., PIB), PEPQ™ (a trademark of Sandoz Chemical, the primary ingredient of which is believed to be a biphenylphosphonite), slip, pigments, colorants, fillers, and the like can also be included in the compositions, to the extent that they do not interfere with the desired properties. The fabricated film may also contain additives to enhance its antiblocking and coefficient of friction characteristics including, but not limited to, untreated and treated silicon dioxide, talc, calcium carbonate, and clay, as well as primary and secondary fatty acid amides, silicone coatings, etc. Other additives to enhance the film's anti-fogging characteristics may also be added, as described, for example, in U.S. Pat. No. 4,486,552 (Niemann), the disclosure of which is incorporated herein by reference. Still other additives, such as quaternary ammonium compounds alone or in combination with EAA or other functional polymers, may also be added to enhance the film's antistatic characteristics and allow packaging of electronically sensitive goods.

Heat Sealable Films made with Compositions of the Present Invention

Films prepared from the compositions of the present invention advantageously have desirable properties such as good seal strength, low initiation temperatures, high ultimate hot tack, and wide processing windows. For example, 2 mil monolayer blown films made with compositions of the present invention often have high hot tack, e.g., ultimate hot tack above about 1, preferably above about 2, more preferably above about 3, even more preferably above about 4 N/in based upon ASTM F 1921, Standard Test Methods for Hot Seal Strength (Hot Tack) of Thermoplastic Polymers and Blends Comprising the Sealing Surfaces of Flexible Webs, Method B with a dwell time of 0.5 seconds and cooling time of 0.1 seconds. The ultimate (or peak) hot tack strength is typically obtained at sealing temperatures at least about 15, preferably at least about 20° C. below the peak melting temperature of the polymer as measured by DSC. Two mil monolayer films made with compositions of the present invention also often have a hot tack of greater than 1 N/in over a temperature range of at least about 20, more preferably at least about 30, more preferably at least about 40, even more preferably at least about 45° C. based upon ASTM F 1921, Method B with a dwell time of 0.5 seconds and cooling time of 0.1 seconds. The seal strength is typically above about 3.75, preferably above about 3.9, more preferably above about 4, even more preferably above about 4.1 lb/in using ASTM F88, Standard Test Method for Seal Strength of Flexible Barrier Materials.

The hot tack temperature window is defined here as the temperature window for which the hot tack strength of the joint is above a specified value, such as 0.5 N/linear inch.

The broad hot tack temperature window of the compositions of the present invention often begins substantially below, e.g., at least about _25° C., preferably at least about _35° C., the peak melting temperature via DSC of the composition. In comparison, the comparative example showed hot tack initiation temperature of above 0.5 N/linear inch at about 10-15° C. below the peak melting temperature via DSC. This allows one to readily control the desired seal strength by modifying the sealing temperature to balance the seal strength and hot tack strength. These properties also allow for higher temperature resistance in applications that require it, e.g., steam sterilization of packaged food.

Heat sealable films made with the composition of the present invention may be employed in either monolayer or multilayer film structures or as laminates. Multilayer film structures are preferred. Regardless of how the film is utilized, it may be prepared by a variety of processes that are well known to those of skill in the art.

Film structures may be made by conventional fabrication techniques, e.g. simple bubble extrusion, biaxial orientation processes (such as tenter frames or double bubble processes), simple cast/sheet extrusion, coextrusion, lamination, etc. Conventional simple bubble extrusion processes (also known as hot blown film processes) are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference.

"Stretched" and "oriented" are used in the art and herein interchangeably, although orientation is actually the consequence of a film being stretched by, for example, internal air pressure pushing on the tube or by a tenter frame pulling on the edges of the film.

Biaxial orientation film manufacturing processes such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Herran et al.), U.S. Pat. No. 4,952,451 (Mueller), and U.S. Pat. Nos. 4,963,419 and 5,059,481 (both to Lustig et al.), the disclosures of which are incorporated herein by reference, can also be used to make the novel film structures of this invention. Biaxially oriented film structures can also be made by a tenter-frame technique, such as that used for oriented polypropylene.

As disclosed by Pahlke in U.S. Pat. No. 3,456,044 and in comparison to the simple bubble method, "double bubble" or "trapped bubble" film processing can significantly increase a film's orientation in both the machine and transverse directions. The increased orientation yields higher free shrinkage values when the film is subsequently heated. Also, Pahlke in U.S. Pat. No. 3,456,044 and Lustig et al. in U.S. Pat. No. 5,059,481 (incorporated herein by reference) disclose that low density polyethylene and ultra low density polyethylene materials, respectively, exhibit poor machine and transverse shrink properties when fabricated by the simple bubble method, e.g., about 3% free shrinkage in both directions. However, in contrast to known film materials, and particularly in contrast to those disclosed by Lustig et al. in U.S. Pat. Nos. 5,059,481; 4,976,898; and 4,863,769, as well as in contrast to those disclosed by Smith in U.S. Pat. No. 5,032,463 (the disclosures of which are incorporated herein by reference), the unique interpolymer compositions of the present invention may show significantly improved simple bubble shrink characteristics in both the machine and transverse directions. Additionally, when the unique interpolymers may be fabricated by simple bubble method at high blow-up ratios, e.g., at greater or equal to 2.5:1, or, more preferably, by the "double bubble" method disclosed by Pahlke in U.S. Pat. No. 3,456,044 and by Lustig et al. in U.S. Pat. No. 4,976,898, it is possible to achieve good machine and transverse direction shrink characteristics making the resultant films suitable for shrink wrap packaging purposes. Blow-Up Ratio, abbreviated herein as "BUR", is calculated by the equation:

$$BUR = \text{Bubble Diameter v. Die Diameter.}$$

The olefin packaging and wrapping films made from compositions of the present invention may be monolayer or multilayer films. The film made from the novel compositions can also be coextruded with the other layer(s) or the film can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, Jun. 15-17 (1981), pp. 211-229 or in "Coextrusion Basics" by Thomas I. Butler, Film Extrusion Manual: Process, Materials, Properties. pp. 31-80 (published by TAPPI Press (1992)), the disclosures of which is incorporated herein by reference. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton (Converting Magazine (September 1992), the disclosure of which is incorporated herein by reference, also discusses lamination versus coextrusion. Monolayer and coextruded films can also go through other post extrusion techniques, such as a biaxial orientation process.

In certain embodiments of this invention, at least one heat sealable, innermost or outermost layer (i.e., skin layer) of a film structure comprises one or more ethylene/α-olefin multi-block interpolymers. This heat sealable layer can be coextruded with other layer(s) or the heat sealable layer can be laminated onto another layer(s) or substrate in a secondary operation, such as that described in Packaging Foods With Plastics, ibid, or that described in "Coextrusion For Barrier Packaging" by W. J. Schrenk and C. R. Finch, Society of Plastics Engineers RETEC Proceedings Jun. 15-17 (1981), pp. 211-229, the disclosures of which are incorporated herein by reference. Preferable substrates include papers, foils, oriented polypropylenes such as industrial grade or BICOR LBW.RTM., polyamides, polyesters, polyethylenes, polyethylene terephthalate, and, metallized substrates.

Should a multilayer film be desired, such may be obtained from a monolayer film which has been previously produced via tubular film (i.e., blown film techniques) or flat die (i.e. cast film) as described by K. R. Osborn and W. A. Jenkins in "Plastic Films, Technology and Packaging Applications" (Technomic Publishing Co., Inc. (1992)), the disclosures of which are incorporated herein by reference, wherein the sealant film must go through an additional post-extrusion step of adhesive or extrusion lamination to other packaging material layers. If the sealant film is a coextrusion of two or more layers (also described by Osborn and Jenkins), the film may still be laminated to additional layers of packaging materials, depending on the other physical requirements of the final packaging film. "Laminations vs. Coextrusions" by D. Dumbleton (Converting Magazine, September 1992), the disclosure of which is incorporated herein by reference, also discusses lamination versus coextrusion. Monolayer and coextruded films can also go through other post-extrusion techniques, such as a biaxial orientation process and irradiation. With respect to irradiation, this technique can also precede extrusion by irradiating the pellets from which the film is to be fabricated prior to feeding the pellets into the extruder, which increases the melt tension of the extruded polymer film and enhances processability.

Extrusion coating is yet another technique for producing packaging materials. Similar to cast film, extrusion coating is a flat die technique. A heat-sealable film comprised of the compositions of the present invention can be extrusion coated onto a substrate either in the form of a monolayer or a coextruded extrudate according to, for example, the processes described in U.S. Pat. No. 4,339,507 incorporated herein by reference. Utilizing multiple extruders or by passing the various substrates through the extrusion coating system several times can result in multiple polymer layers each providing some sort of performance attribute whether it be barrier, toughness, or improved hot tack or heat sealability. Some typical end use applications for multi-layered/multi-substrate systems are for cheese packages. Other end use applications include, but are not limited to moist pet foods, snacks, chips, frozen foods, meats, hot dogs, and numerous other applications.

Generally for a multilayer film structure, the novel compositions described herein comprise at least one layer of the total multilayer film structure. Other layers of the multilayer structure may be included to provide a variety of performance attributes. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, poly (ethylene terephthalate) (PET), polyvinylidene chloride (PVDC), polyethylene terephthalate (PET), oriented polypropylene (OPP), ethylene/vinyl acetate (EVA) copolymers, ethylene/acrylic add (EAA) copolymers, ethylene/methacrylic add (EMAA) copolymers, LLDPE, HDPE, LDPE, nylon, graft adhesive polymers (e.g., maleic anhydride grafted polyethylene), styrene-butadiene polymers (such as K-resins, available from Phillips Petroleum), and paper. Generally, the multilayer film structures comprise from 2 to about 7 layers.

The thickness of the multilayer structures is typically from about 0.5 mil to about 4 mils (total thickness). The heat sealable film layer varies in thickness depending on whether it is produced via coextrusion or lamination of a monolayer or coextruded film to other packaging materials. In a coextrusion, the heat sealable film layer is typically from about 0.1 to about 3 mils, preferably from about 0.4 to about 2 mils. In a laminated structure, the monolayer or coextruded heat sealable film layer is typically from about 0.5 to about 2 mils, preferably from 1 to 2 mils. For a monolayer film, the thickness is typically between about 0.4 mil to about 4 mils, preferably between about 0.8 to about 2.5 mils.

The heat sealable films of the invention can be made into packaging structures such as form-fill-seal structures or bag-in-box structures. For example, one such form-fill-seal operation is described in Packaging Foods With Plastics, ibid, pp. 78-83. Packages can also be formed from multilayer packaging roll stock by vertical or horizontal form-fill-seal packaging and thermoform-fill-seal packaging, as described in "Packaging Machinery Operations: No. 8, Form-Fill-Sealing, A Self-Instructional Course" by C. G. Davis, Packaging Machinery Manufacturers Institute (April 1982); The Wiley Encyclopedia of Packaging Technology by M. Bakker (Editor), John Wiley & Sons (1986), pp. 334, 364-369; and Packaging: An Introduction by S. Sacharow and A. L. Brody, Harcourt Brace Javanovich Publications, Inc. (1987), pp. 322-326. The disclosures of all of the preceding publications are incorporated herein by reference. A particularly useful device for form-fill-seal operations is the Hayssen Ultima Super CMB Vertical Form-Fill-Seal Machine. Other manufacturers of pouch thermoforming and evacuating equipment include Cryovac and Koch. A process for making a pouch with a vertical form-fill-seal machine is described generally in U.S. Pat. Nos. 4,503,102 and 4,521,437, both of which are incorporated herein by reference. Film structures containing one or more layers comprising a heat sealable film of the present invention are well suited for the packaging of potable water, wine, cheese, potatoes, condiments, and similar food products in such form-fill-seal structures.

The film structures made with both the interpolymers described herein may also be pre-formed by any known method, such as, for example, by extrusion thermoforming, with respect to the shape and contours of the product to be packaged. The benefit of employing pre-formed film structures will be to complement or avoid a given particular of a packaging operation such as augment drawability, reduced film thickness for given draw requirement, reduced heat up and cycle time, etc.

Film structures made from the ethylene/α-olefin multi-block interpolymers described herein may show surprisingly more efficient irradiation crosslinking as compared to a comparative conventional Ziegler polymerized linear ethylene/α-olefin polymer. As one aspect of this invention, by taking advantage of the irradiation efficient of these unique polymers, it possible the prepare film structures with differentially or selectively crosslinked film layers. To take further advantage of this discovery, specific film layer materials including the present ethylene/α-olefin multi-block interpolymers can be formulated with pro-rad agents, such as triallyl cyanurate as described by Warren in U.S. Pat. No. 4,957,790, and/or with antioxidant crosslink inhibitors, such as butylated hydroxytoluene as described by Evert et al. in U.S. Pat. No. 5,055,328.

Irradiation crosslinking is also useful for increasing the shrink temperature range and the heat seal range for the film structures. For example, U.S. Pat. No. 5,089,321, incorporated herein by reference, discloses multilayer film structures comprising at least one heat sealable outer layer and at least one core layer which have good irradiation crosslinking performance. Among irradiation crosslinking technologies, beta irradiation by electron beam sources and gamma irradiation by a radioactive element such as Cobalt 60 are the most common methods of crosslinking film materials.

In an irradiation crosslinking process, a thermoplastic film is fabricated by a blown film process and then exposed to an irradiation source (beta or gamma) at an irradiation dose of up to 20 Mrad to crosslink the polymeric film. Irradiation crosslinking can be induced before or after final film orientation whenever oriented films are desired such as for shrink and skin packaging, however, preferably irradiation crosslinking is induced before final orientation. When heat-shrinkable and skin packaging films are prepared by a process where pellet or film irradiation precedes final film orientation, the films invariably show higher shrink tension and will tend yield higher package warpage and board curl; conversely, when orientation precedes irradiation, the resultant films will show lower shrink tension. Unlike shrink tension, the free shrink properties of the ethylene/α-olefin multi-block interpolymers of the present invention are believed to be essentially unaffected by whether irradiation precedes or follows final film orientation.

Irradiation techniques useful for treating the film structures described herein include techniques known to those skilled in the art. Preferably, the irradiation is accomplished by using an electron beam (beta) irradiation device at a dosage level of from about 0.5 megarad (Mrad) to about 20 Mrad. Shrink film structures fabricated from the ethylene/α-olefin multi-block interpolymers as described herein are also expected to exhibit improved physical properties due to a lower degree of chain scission occurring as a consequence of the irradiation treatment.

The interpolymers, blends, and films of this invention, and the methods for preparing them, are more fully described in the following examples.

Examples 1-2 of the Present Invention—Monolayer Blown Films

Ethlylene-octene and ethylene-butene multi-block interpolymers used in Examples 1 and 2 below were prepared as described in PCT Application No. PCT/US2005/008917, filed on Mar. 17, 2005, which in turn claims priority to U.S. Provisional Application No. 60/553,906, filed Mar. 17, 2004 each of which is incorporated by reference herein. The comparative example is a random ethylene-octene copolymer prepared using a constrained geometry catalyst such as those sold under the name AFFINITY® by The Dow Chemical Company. The polymers have a melt index of about 1 g/10 min.

Monolayer blown films of the olefin block copolymers and that of the comparative example were prepared using a Davis-Standard blown film coextrusion line equipped with three Davis-Standard Model DS075HM ¾" inch extruders with 24:1 LID ratios which feed a 2 inch diameter blown die with a nominal 0.033" die gap. The output rate was about 2.8 pounds per hour or 0.05 lb/hr/rpm. The extruder zone temperatures are set at 330/350/390 and 400 F for Zone 1/2/3 and die zone. The film thickness was 2 mil at a blow-up-ratio (BUR) of 2.1:1 and a nip line speed of about 7 foot per minute (fpm).

The hot tack strength and seal strength of the blown films were measured. The hot tack, or hot seal strength was measured based upon ASTM F 1921, Method B. The term "Hot tack" is used as an expression for the strength of the heat seals immediately after the sealing operation and before the seal cools to ambient temperature. The dwell time was 0.5 seconds at pre-set temperatures; the cooling time was 0.1 seconds.

The term "seal strength" is the strength of the heat seals after they have been allowed to cool to ambient temperature. The heat seal strength was measured based upon ASTM Standard Test Method E88, STM for Seal Strength of Flexible Barrier Materials. The test result is a measure of the force required to pull apart the heat seal, or the force required to break the film in cases where the film breaks before the heat seal parts.

The results give the heat seal strength in terms of the sealing temperature. The data are tabulated in Table A:

TABLE A

Hot tack and heat seal strength of blown films

| Property | Unit | Example 1 | Example 2 | Comparative Example |
|---|---|---|---|---|
| Comonomers | | Ethylene/octene | Ethylene/butene | Ethylene/octene |
| Density of resin | g/cc | 0.901 | 0.901 | 0.902 |
| Film thickness | mil | 2 | 2 | 2 |
| Peak hot tack | N/in | 4.7 | 2.4 | 0.7 |
| Peak temperature | ° C. | 110 | 105 | 85 |
| Temperature window for hot tack > 0.5 N/in, ° C. | | >50 | >40 | 10-15 |
| Temperature window for hot tack > 1 N/in, ° C. | | 40 | 30 | — |
| Peak heat seal strength lb/in | | 4.41 | 4.16 | 5.16 |

The hot tack strength vs. hot tack sealing temperature is shown in Table B.

TABLE B

Hot tack strength (N/in) as a function of hot tack sealing temperatures of blown films

| | Example 1 | Example 2 | Comparative Example |
|---|---|---|---|
| | | Comonomers | |
| Hot Tack Temperature | Ethylene/octene | Ethylene/butene | Ethylene/octene |
| 50° C. | 0.13 | — | — |
| 60° C. | 1.14 | — | — |
| 70° C. | 1.63 | 0.32 | 0.35 |
| 80 | 1.94 | 0.89 | 0.72 |
| 90° C. | 2.28 | 0.96 | 0.38 |
| 100° C. | 2.75 | 1.92 | 0.12 |
| 110° C. | 0.13 | 2.92 | — |
| 120° C. | — | 0.23 | — |

Example 3 of the Present Invention—Multi-layer Co-extruded Film

Ethylene-octene multi-block interpolymers used in Example 3 below was prepared as described in PCT Application No. PCT/US2005/008917, filed on Mar. 17, 2005, which in turn claims priority to U.S. Provisional Application No. 60/553,906, filed Mar. 17, 2004 each of which is incorporated by reference herein. The comparative example is a random ethylene-octene copolymer prepared using a constrained geometry catalyst such as those sold under the name AFFINITY® by The Dow Chemical Company. The polymers have a melt index of about 1 g/10 min.

Three layer co-extruded film of the olefin block copolymer (OBC) and that of the comparative example were prepared using conventional co-extrusion techniques. The co-extruded films have three layers: a backing layer, a tie layer and the sealant layer. The inventive example is compared with a reference film having the same backing layer and tie layer, but differing in the sealant layer composition. Specifically, the backing layer is 1 mil in thickness, made of 100% Capron CA95QP (Supplied by BASF Corporation). The tie layer is 1 mil in thickness, made of 85% DOWLEX 2045G (LLDPE) (Supplied by The Dow Chemical Company) and 15% AMPLIFY GR205 (Maleic anhydride modified polyethylene, HDPE-g-MAH) (Supplied by The Dow Chemical Company). The sealant layer contains 5% Ampacet 100329 and 2.5% Ampacet 100432 with the remainder OBC or AFFINITY®. The film comprises layers of 1.5 mil sealant/1.0 mil tie/1.0 mil backing.

The hot tack strength and heat seal strength were measured in a similar manner as described above for Examples 1 and 2. The results are shown below.

Comparison of hot tack behaviors of 3-layer coextruded films.

| Temperature | Inventive Example | Reference (prior art) |
|---|---|---|
| Sealant main component | OBC, 1MI, 0.897 g/cm3 (62/38, .869/.945) | AFFINITY ® PL1880G (1MI, 0.900 g/cm3) |
| Temperature (° C.) | Hot tack strength (N/in) | Hot tack strength (N/in) |
| 70 | 0.07 | NA |
| 80 | 1.64 | 0.06 |
| 90 | 7.68 | 2.37 |
| 110 | 7.37 | 6.68 |
| 120 | 5.61 | 5.19 |

Comparison of heat seal data of 3-layer coextruded films having layer thickness of 1.5/1.0/1.0 mil of sealant/tie/backing layers.

| Temperature | Inventive Example | Reference (prior art) |
|---|---|---|
| Sealant main component | OBC, 1MI, 0.897 g/cm3 (62/38, .869/.945) | AFFINITY ® PL1880G (1MI, 0.900 g/cm3) |
| Temperature (° C.) | Heat seal strength (lb/in) | Heat seal strength (lb/in) |
| 80 | 0.36 | NA |
| 90 | 7.5 | 0.67 |
| 100 | 8.7 | 7.5 |
| 110 | 10.8 | 7.9 |
| 120 | 10.9 | 7.9 |
| 130 | 10.9 | 7.9 |
| 140 | 12.3 | 8.5 |
| 150 | 11.2 | 8.4 |

The inventive example showed lower hot tack initiation temperature with similar or higher hot tack strength compared to the Reference. Similarly, the inventive example showed lower heat seal initiation temperature and higher heat seal strength compared to the Reference.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

The invention claimed is:

1. A composition exhibiting high hot tack comprising at least one ethylene/α-olefin multi-block interpolymer, wherein the ethylene/α-olefin interpolymer comprises at least 60 mole percent ethylene and:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2; \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1.

2. A heat-sealable film layer composition comprising at least one ethylene/α-olefin multi-block interpolymer, wherein the ethylene/α-olefin interpolymer comprises at least 60 mole percent ethylene and:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2; \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$\Delta T \geq 48°$ C. for $\Delta H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$;

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1;

wherein the ethylene/α-olefin interpolymer has a density of from about 0.89 g/cc to about 0.94 g/cc.

3. The heat-sealable film layer composition of claim 2 wherein the density is from about 0.900 g/cc to about 0.925 g/cc.

4. The heat-sealable film layer composition of claim 2 wherein the melt index ($I_2$) is from about 0.5 g/10 min. to about 3 g/10 min.

5. The heat-sealable film layer composition of claim 3 wherein the melt index ($I_2$) is from about 0.5 g/10 min. to about 3 g/10 min.

6. The heat-sealable film layer composition of claim 2 wherein the composition is suitable for a blown film layer.

7. The heat-sealable film layer composition of claim 2 wherein the composition is suitable for a blown film layer with a thickness of from about 1 to about 3 mils.

8. The heat-sealable film layer composition of claim 2 wherein the ethylene/α-olefin interpolymer is ethylene-octene copolymer.

9. The heat-sealable film layer composition of claim 2 wherein the ethylene/α-olefin interpolymer is ethylene-butene copolymer.

10. The heat-sealable film layer composition of claim 2 wherein the ethylene/α-olefin interpolymer is ethylene-hexene copolymer.

11. The heat-sealable film layer composition of claim 2 wherein the ultimate hot tack is above about 2 N/in based upon ASTM F 1921, Method B.

12. The heat-sealable film layer composition of claim 3 wherein the ultimate hot tack is above about 2 N/in based upon ASTM F 1921, Method B.

13. The heat-sealable film layer composition of claim 4 wherein the ultimate hot tack is above about 2 N/in based upon ASTM F 1921, Method B.

14. The heat-sealable film layer composition of claim 2 wherein a 2 mil monolayer film of said composition has a hot tack of greater than about 1 N/in over a temperature range of at least about 20° C.

15. The heat-sealable film layer composition of claim 2 wherein a 2 mil monolayer film of said composition has a hot tack of greater than 1 N/in over a temperature range of at least about 40° C.

* * * * *